May 31, 1932.  A. H. STEBBINS  1,861,248
AIR CLASSIFIER
Filed Jan. 3, 1930
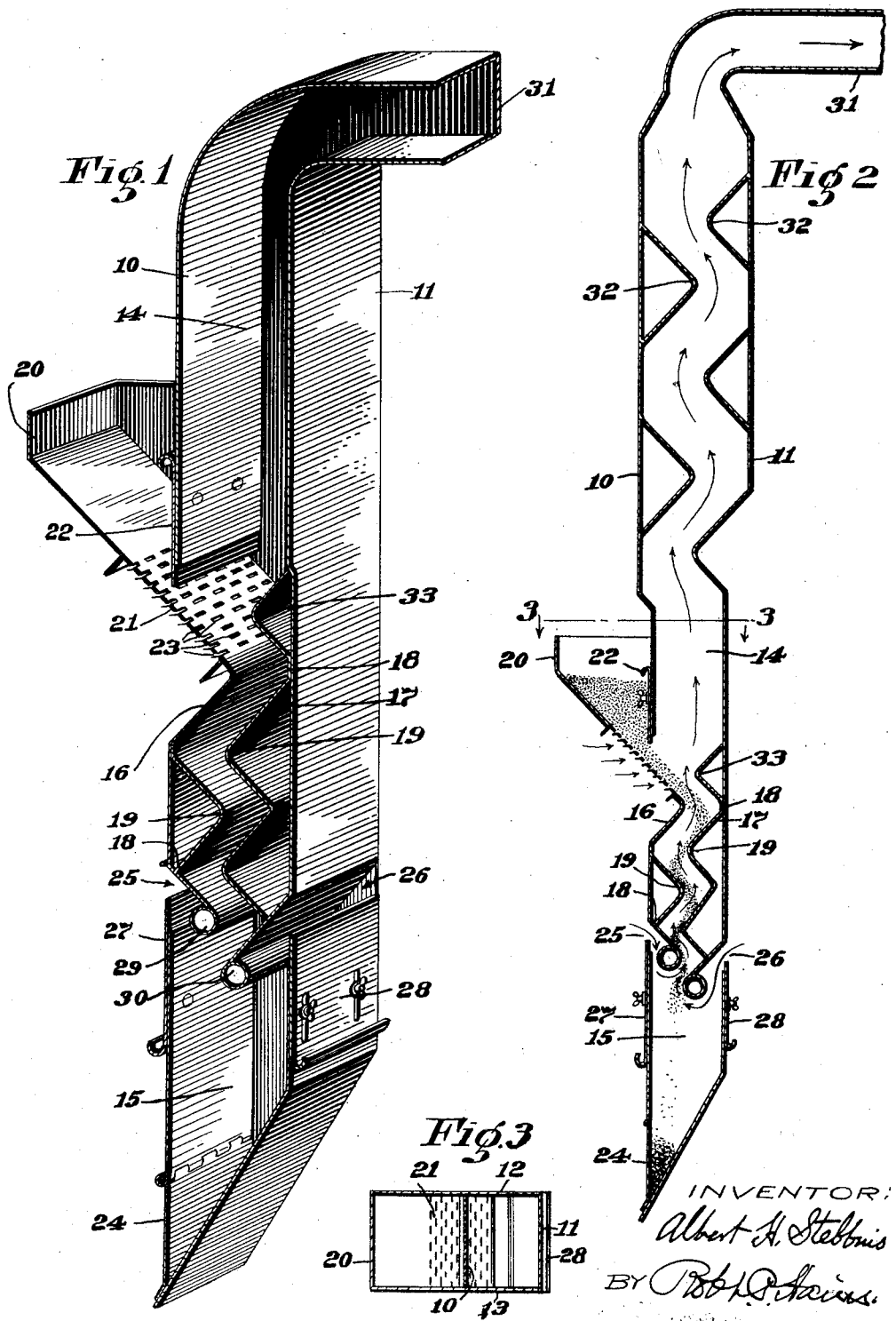

Patented May 31, 1932

1,861,248

UNITED STATES PATENT OFFICE

ALBERT H. STEBBINS, OF LOS ANGELES, CALIFORNIA

AIR CLASSIFIER

Application filed January 3, 1930. Serial No. 418,227.

This invention relates to air classifiers of the type in which a separation of materials is produced by passing air upwardly through a stream of falling materials.

In the treatment of ores and other materials in a crushed or comminuted condition it frequently is desirable to subject the materials to a preliminary classifying operation to remove the minute particles and dust from the coarser particles, and if the ores or other materials to be treated are of low grade, they can not be profitably worked unless the required treatments can be performed at low cost.

There is therefore an urgent need of a preliminary classifier that is capable of handling a large amount of crushed materials at low cost to remove from these materials the minute particles and dust.

Various forms of air classifiers have been proposed heretofore, and while some of them work very well they can not be operated as economically as is required to profitably work many low grade materials.

The present invention therefore relates to a novel form of air classifier which is extremely simple in construction and operation and is so designed that a relatively small classifier has a large output per hour and performs the desired separation at a low operating cost.

An important feature of the present invention resides in an air classifier having an upright, zigzag conduit to which a stream of the materials to be separated is delivered to pass downwardly within the conduit, while currents of air are caused to pass upwardly through the falling materials within the conduit to remove the minute particles and dust.

The materials to be treated are preferably fed directly into the conduit by a hopper and all tendencies of the materials to clog at the discharge opening of the hopper or along the feed chute may be prevented by providing the feed hopper with apertures through which air is drawn into the classifying receptacle with sufficient force to keep the materials moving.

Another feature of the invention resides in means for regulating the volume of air permitted to enter the lower end of the zigzag conduit to pass upwardly therein through the falling materials.

Still a further feature of the invention resides in the construction whereby the material laden air passes from the zigzag conduit into a settling chamber so that the heavier particles picked up by the air will have an opportunity to move downwardly into the conduit for further treatment.

Other features of the invention and novel combination of parts in addition to the above will be hereinafter described in connection with the accompanying drawings which illustrate good practical forms thereof.

In the drawings:—

Fig. 1 is a perspective view of an air classifier constructed in accordance with the present invention.

Fig. 2 is a vertical sectional view through a modified form of air classifier; and Fig. 3 is a sectional view taken on the line 3—3 of Fig. 2.

In the embodiments of the invention illustrated the air classifier consists of an upright receptacle having the enclosing walls 10, 11, 12 and 13, and in the upper portion of the receptacle is provided a settling chamber 14 while in the lower portion of the receptacle is provided the material receiving chamber 15. Between the chambers 14 and 15 is provided a zigzag conduit having the spaced zigzag walls 16 and 17 and these walls may have their outer bends 18 connected to the walls 10 and 11 for support. The inner bends of the zigzag walls are preferably rounded as at 19 to present rounded curved portions for directing the rising air currents against the stream of falling materials.

The materials to be treated are supplied to the zigzag conduit by a feed chute 20 disposed at one side of the receptacle and having the inclined feed chute 21 that is shown as constituting a continuation of the upper portion of the wall 16. The rate at which the materials are supplied to the conduit by the hopper 20 may be controlled by adjusting the sliding gate 22. Danger of the materials becoming clogged at the discharge opening of the hopper or along the chute 21 is prevented by providing this chute with the air inlet apertures 23 for introducing air into the receptacle through the materials resting upon the chute 21.

The materials delivered to the zigzag conduit move downwardly therein under the influence of gravity and are repeatedly air swept by the stream of air moving upwardly therein as indicated by the arrows in Fig. 2. The heavier materials discharged from the lower end of the conduit pass into the chamber 15 to collect therein, and this chamber is preferably provided with the automatically closing door 24 which will swing open from time to time under the weight of the accumulated materials to permit them to escape from the receptacle.

The air that passes upwardly through the zigzag conduit, in the construction shown is admitted into the upper portion of the chamber 15 through the openings 25, 26 the size of which may be varied by adjusting the gates 27, 28. The lower ends of the zigzag walls 16, 17 are preferably rounded to guide the air smoothly into the conduit and the end portions of these walls may be bent to form the transversely extending tubes 29, 30 around which the air may flow smoothly in passing from the air inlet openings into the conduit as will be apparent from Fig. 2.

The upper portion of the air classifier of the present invention is connected to a fan, suction air classifier or other suction producing machine as desired, and the classifier is provided at its upper end with a laterally extending pipe 31 through which air may be exhausted from the chamber 14 to draw air from the atmosphere into the receptacle through the apertures 23 and upwardly through the zigzag conduit.

As a result of the construction described the stream of materials passing downwardly within the zigzag conduit will repeatedly cross the stream of air rising therein as will be apparent from Fig. 2. In this manner the materials are repeatedly air swept and the dust and minute particles will be picked up by the air while the clean coarse particles will move downwardly into the chamber 15.

The construction and operation of the classifier of Fig. 2 is the same as that of Fig. 1 except that in Fig. 2 the air deflecting baffles 32 are provided in the extended upper chamber 14 to direct the materials that tend to settle in this chamber into the path of the rising air currents.

It may be desirable to so construct the zigzag conduit that its cross sectional area increases in an upwardly direction as will be apparent from the drawings, and also to restrict the size of this passage slightly opposite the feed chute 21 as indicated by 33 where it will be seen that this portion of the passage lies comparatively close to the chute 21.

It will be seen from the foregoing that the classifier of the present invention is extremely simple in construction and that the stream of materials passing downwardly within the zigzag conduit is directed repeatedly back and forth across the path of air moving upwardly therein to subject every portion of the stream of materials to the cleansing action of the air, and that the coarse particles that are carried upwardly into the upper chamber 14 will have a chance to settle back into the zigzag conduit for further treatment.

While the classifier of the present invention is adapted for use in treating materials of various sizes, it is particularly well adapted for use in treating ores and other materials crushed to about $\frac{1}{8}$ of an inch to remove therefrom the dust and minute particles. It is found that a comparatively small classifier constructed in accordance with the present invention has a surprising large output capacity, as a machine 10 inches wide measured from wall 12 to 13 is capable of thoroughly treating ten tons of material per hour.

What is claimed is:

1. An air classifier comprising in combination, an upright receptacle having a material receiving chamber at its lower end and a material settling chamber at its upper end, a zigzag conduit leading from the lower to the upper chamber and is provided with continuous zigzag walls disposed in spaced relation to each other to form a continuous tortuous passage constructed to confine both the air and materials being treated within the zigzag passage, and provided with a reduced throat at its lower end to increase the air sweeping action at this point, means for introducing the materials to be treated into the upper portion of the conduit to move downwardly therein, means for exhausting air from the upper end of the receptacle, and means for introducing air from the atmosphere into the zigzag passage so as to produce air streams curving upwardly around the lower end of each zigzag wall to more effectively treat the materials adjacent to each wall at this point.

2. An air classifier comprising in combination, an upright receptacle having a material receiving chamber at its lower end and a material settling chamber at its upper end, a zigzag conduit leading from the lower to the upper chamber and provided with continuous zigzag walls disposed in spaced relation to each other to form a continuous tortuous passage constructed to confine both the air and materials being treated within the zigzag passage, an inclined chute for delivering a stream of materials into the upper portion of said conduit and provided with air inlet apertures, means for introducing air from the atmosphere into the zigzag passage so as to produce air streams curving upwardly around the lower end of each zigzag wall, and means for exhausting air from the upper chamber to draw air upwardly within the passage through the falling materials and through the apertures in the inclined chute to promote the flow of materials into the conduit.

3. An air classifier comprising in combination, an upright receptacle having a material receiving chamber at its lower end and a material settling chamber at its upper end, a zigzag conduit leading from the lower to the upper chamber and provided with continuous zigzag walls disposed in spaced relation to each other to form a continuous tortuous passage constructed to confine both the air and the materials being treated within the zigzag passage, means for introducing the materials to be treated into the upper portion of the conduit to move downwardly therein, means for introducing air from the atmosphere into the zigzag passage so as to produce air streams curving upwardly around the lower end of each zigzag wall, and means for exhausting air from the upper chamber to draw air upwardly within the passage through the falling materials to air sweep the materials moving downwardly in the zigzag passage.

In testimony whereof I have signed my name to this specification.

ALBERT H. STEBBINS.